United States Patent
Glazemakers et al.

(10) Patent No.: US 12,341,754 B2
(45) Date of Patent: Jun. 24, 2025

(54) PRIVATE NETWORK ACCESS

(71) Applicant: Appgate Cybersecurity, Inc., Coral Gables, FL (US)

(72) Inventors: Kurt Glazemakers, Grembergen (BE); Gokhan Berberoglu, Gothenburg (SE); Natan Abolafya, Gothenburg (SE); Thomas Bruno Emmanuel Cellerier, Kungalv (SE); Per Leino, Gothenburg (SE); Arturo Segundo García Payares, Bogota (CO); Kosmas Valianos, Ojersjo (SE)

(73) Assignee: APPGATE CYBERSECURITY, INC., Coral Gables, FL (US)

( * ) Notice: Subject to any disclaimer, the term of this patent is extended or adjusted under 35 U.S.C. 154(b) by 377 days.

(21) Appl. No.: 17/403,700

(22) Filed: Aug. 16, 2021

(65) Prior Publication Data

US 2023/0049547 A1 Feb. 16, 2023

(51) Int. Cl.
*H04L 29/06* (2006.01)
*H04L 9/40* (2022.01)
*H04L 61/256* (2022.01)

(52) U.S. Cl.
CPC ........ *H04L 63/0272* (2013.01); *H04L 61/256* (2013.01); *H04L 63/0281* (2013.01); *H04L 63/20* (2013.01)

(58) Field of Classification Search
CPC ............... H04L 63/0272; H04L 61/256; H04L 61/2592
See application file for complete search history.

(56) References Cited

U.S. PATENT DOCUMENTS

| | | | | |
|---|---|---|---|---|
| 2002/0023210 A1* | 2/2002 | Tuomenoksa | ...... | H04L 41/5032 713/168 |
| 2003/0154306 A1* | 8/2003 | Perry | ...... | H04L 61/00 709/239 |
| 2008/0134315 A1* | 6/2008 | Tamura | ...... | H04L 63/08 726/12 |
| 2015/0046997 A1* | 2/2015 | Gupta | ...... | H04L 63/1458 726/7 |
| 2017/0279803 A1* | 9/2017 | Desai | ...... | H04L 67/02 |

* cited by examiner

*Primary Examiner* — Ellen Tran
(74) *Attorney, Agent, or Firm* — Greenberg Traurig (57) ABSTRACT

A method is disclosed including establishing a browser session in response to receiving a request from a browser application in a public network. The browser session is assigned to a dedicated network service running in a dedicated network name space. Requests received from the browser application are proxied to a dedicated network service. A local web session in the dedicated network service authenticates a user of the browser application for access to at least one private webservice. A security client in the dedicated network service establishes a networking tunnel between the proxy and a remote gateway to the private network, thereby obtaining network access to the private webservice from the dedicated network name space. Within the dedicated network name space, proxied requests addressing the private webservice are forwarded over the networking tunnel to the private network.

20 Claims, 8 Drawing Sheets

PRIVATE NETWORK ACCESS

RELATED APPLICATIONS

The present application relates to U.S. Pat. No. 9,628,444, entitled "Protecting Network Devices by a Firewall;" U.S. Pat. No. 9,560,015, entitled "Systems And Methods For Protecting Network Devices By A Firewall;" and US Publication No. 2016/0099917, entitled "Multi-Tunneling Virtual Network Adapter;" each of which are hereby incorporated by reference in their entirety.

FIELD OF THE TECHNOLOGY

At least some embodiments generally relate to the field of network protection and more particularly, but not limited to, the protection of private networks by a gateway including a tunnel server such as a VPN server and a firewall.

BACKGROUND

In order to protect private networks from unwanted network access, a firewall may be implemented in a gateway in order to selectively filter communication from and to the private network. By applying firewall rules, the firewall then lets network packets pass, or blocks them in one or both directions. The rules are typically defined by the source and/or destination addresses of the network packets, or the source and/or destination ports of the network packets.

A firewall may further perform stateful packet inspection thereby keeping track of the state of networking connections such as, for example, TCP or UDP networking connections. This way, a finer-grained control is possible as the rules become dependent on the network connection and thus dynamic. The firewall keeps track of all open network connections by maintaining a table, the state table or state list, with all the pending connections.

In order to have better control on the network traffic passing by a gateway, the firewall may further perform deep packet inspection by controlling the payload data of the networking packets. This way, different types of control can be implemented such as, for example, user access or authorization, protocol compliance, spam filtering and virus detection.

In order to protect a private network further, the gateway's firewall may be combined with network tunneling. Access to the private network may then be established by a VPN (Virtual Private Network) where a secured networking tunnel is set up between a client device and the gateway. The setup of such a tunnel is only granted upon successful authentication with the gateway, which then functions as a VPN server. By the combination of a firewall and VPN server in the gateway, access to devices in the private network can be authorized on a client or a user level by the VPN server and on a network level by the firewall.

SUMMARY

According to an example aspect, a method is disclosed for providing browser-based access from a public network to at least one private webservice by a proxy, wherein the private webservice is network addressable by a private network address within a private network; and wherein the private webservice is identifiable by a domain name that resolves to the private network address within the private network and resolves to the proxy within the public network; the method comprising the following steps performed by the proxy: upon request of a browser application in the public network, establish a browser session; assign the browser session to a dedicated network service running in a dedicated network name space; proxying requests received from the browser application to the dedicated network service and vice versa; authenticate, by a local web session in the dedicated network service, a user of the browser application for access to the at least one private webservice; establish, by a security client in the dedicated network service, a networking tunnel between the proxy and a remote gateway to the private network thereby obtaining network access to the private webservice from the dedicated network name space; and forwarding, within the dedicated network name space, proxied requests addressing the private webservice over the networking tunnel to the private network.

According to example embodiments, the proxying comprises marking the requests of the browser application to identify the browser session; by the marking, identify the dedicated networking service and route the requests to the dedicated network service.

According to example embodiments, the proxying further comprises replace the source address of the requests of the browser application with the network address of the proxy.

According to example embodiments the proxying further comprises: when a request is destined for the domain name, resolve the private network address of the private webservice by performing a name resolving request over the networking tunnel within the private network; replace the destination address of the request with the private network address.

According to example embodiments, the resolving further comprises: mark the name resolving request according to the browser session; forward the marked name resolving request to a local name resolving service within the proxy; by the local name resolving service, based on the marking, identify a private name resolving service within the private network assigned to the security client; unmark and forward the name resolving request to the identified private name resolving service; receive the resolved private network address in return.

According to example embodiments the establishing the networking tunnel further comprises obtaining at least one private name resolving service for resolving domain names within the private network.

According to example embodiments the establishing the networking tunnel further comprises registering the at least one private name resolving service with the local name resolving service; and associating the at least one private name resolving service with the browser session.

According to example embodiments the proxying further comprises when receiving a request associated with an unauthenticated web session, redirecting the request to a landing page within the local web service to perform the authenticating the user.

According to example embodiments the proxying further comprises when receiving a request for the proxy, and when the request is associated with an authenticated web session, then redirecting the request to a landing page with a reference to the at least one private web service.

According to example embodiments the authenticating further comprises: receiving access credentials from the user; authenticating by the access credentials the user with an authentication server; receiving from the authentication server a client access list identifying: the at least one private webservice, at least one remote gateway for accessing the respective at least one private webservice, at least one private name resolving service for resolving the private network address of the at least one private webservice; receiving from the authentication server a client tunnel list comprising tunnel authentication information for establishing network tunnels with the respective at least one remote gateway.

According to an example aspect the disclosure relates to controller comprising at least one processor and at least one memory including computer program code, the at least one memory and computer program code configured to, with the at least one processor, cause the controller to perform: providing browser-based access from a public network to at least one private webservice, wherein the private webservice is network addressable by a private network address within a private network; and wherein the private webservice is identifiable by a domain name that resolves to the private network address within the private network and resolves to the controller within the public network; upon request of a browser application in a public network, establish a browser session; assign the browser session to a dedicated network service running in a dedicated network name space; proxying requests received from the browser application to the dedicated network service and vice versa; authenticate, by a local web session in the dedicated network service, a user of the browser application for access to the at least one private webservice; establish, by a security client in the dedicated network service, a networking tunnel between the controller and a remote gateway to the private network thereby obtaining network access to the private webservice from the dedicated network name space; and forwarding, within the dedicated network name space, proxied requests addressing the private webservice over the networking tunnel to the private network.

According to an example aspect the disclosure relates to a computer program product comprising computer-executable instructions for causing a proxy to perform at least the following: providing browser-based access from a public network to at least one private webservice, wherein the private webservice is network addressable by a private network address within a private network; and wherein the private webservice is identifiable by a domain name that resolves to the private network address within the private network and resolves to the proxy within the public network; upon request of a browser application in a public network, establish a browser session; assign the browser session to a dedicated network service running in a dedicated network name space; proxying requests received from the browser application to the dedicated network service and vice versa; authenticate, by a local web session in the dedicated network service, a user of the browser application for access to the at least one private webservice; establish, by a security client in the dedicated network service, a networking tunnel between the proxy and a remote gateway to the private network thereby obtaining network access to the private webservice from the dedicated network name space; and forwarding, within the dedicated network name space, proxied requests addressing the private webservice over the networking tunnel to the private network.

According to an example aspect the disclosure relates to a computer readable storage medium comprising computer-executable instructions for performing the following steps when the program is run on a computer: providing browser-based access from a public network to at least one private webservice, wherein the private webservice is network addressable by a private network address within a private network; and wherein the private webservice is identifiable by a domain name that resolves to the private network address within the private network and resolves to the computer within the public network; upon request of a browser application in a public network, establish a browser session; assign the browser session to a dedicated network service running in a dedicated network name space; proxying requests received from the browser application to the dedicated network service and vice versa; authenticate, by a local web session in the dedicated network service, a user of the browser application for access to the at least one private webservice; establish, by a security client in the dedicated network service, a networking tunnel between the computer and a remote gateway to the private network thereby obtaining network access to the private webservice from the dedicated network name space; and forwarding, within the dedicated network name space, proxied requests addressing the private webservice over the networking tunnel to the private network.

DETAILED DESCRIPTION

Example embodiments relate to the protection of networking devices from unauthorized access within a computer network. Some embodiments relate to the authorization of clients by allowing the clients access to services provided by the networking devices.

Example embodiments relate to the protection of networking devices on the networking level, i.e., by only allowing authorized or trusted clients to have network access to a certain networking device. In the current disclosure, it is understood that a client has network access to a networking device when data packets can be exchanged at the network and/or transport layer level such as, for example, when IP or Internet Protocol datagrams from the client can reach the application server or when a TCP/IP socket can be established between the client and the networking device.

Figure 1:
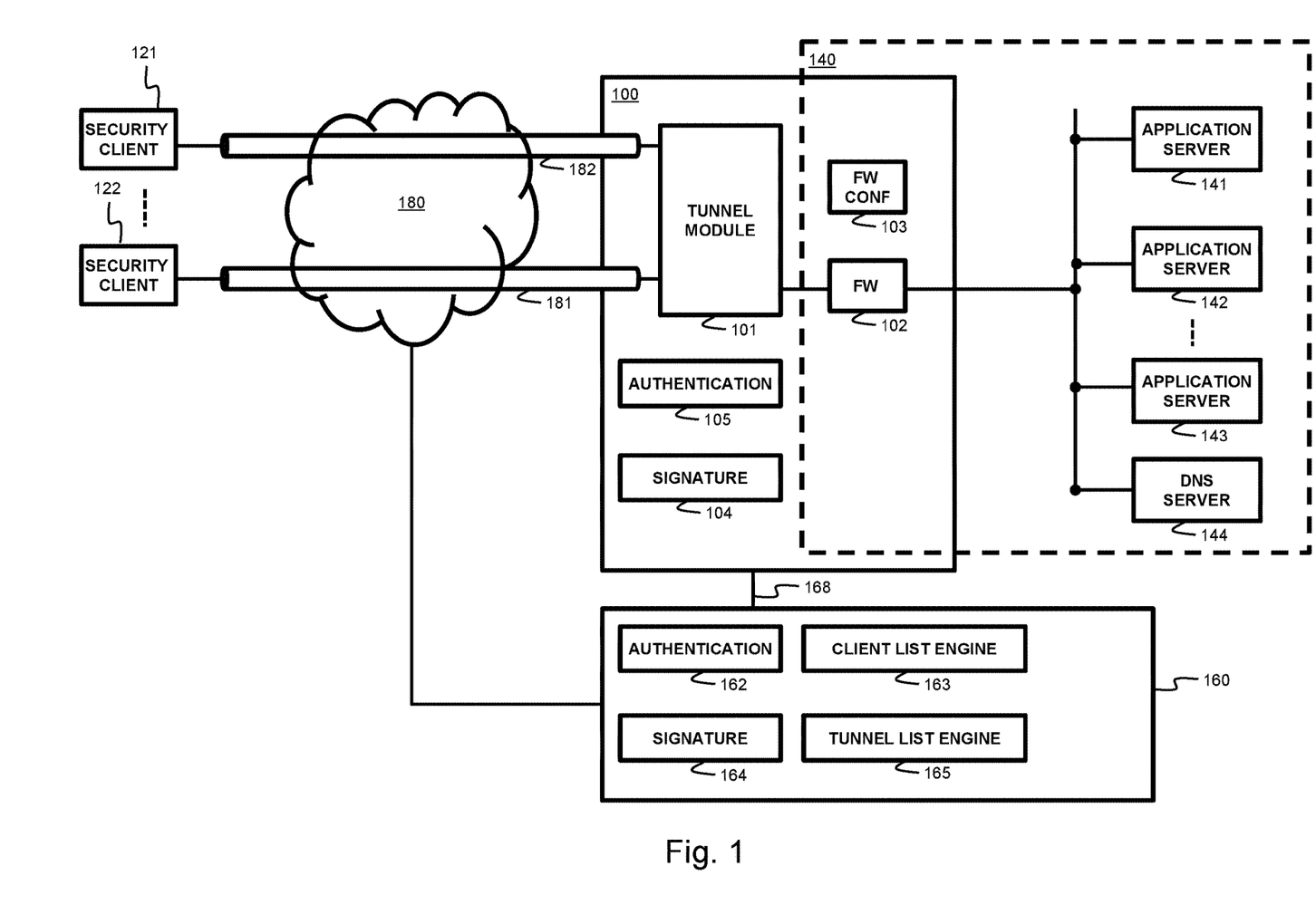
FIG. 1 illustrates a system for the protection of networking devices from unwanted network access according to example embodiments.

FIG. 1 illustrates a system for the protection of networking devices from unwanted network access, according to an embodiment. For illustrative purposes three application servers 141, 142, and 143 are shown as networking devices. The application servers 141-143 are part of a private network 140 allowing network access to the servers from within the private network by a private network address. The term private refers to the fact that the application servers are not globally routable, i.e., they cannot be addressed by their private network address from outside the private network as the scope of the private network address is that of the private network itself. The Internet Protocol or IP protocol, more generally referred to as the TCP/IP protocol, may further be used as communication protocol within the private network 140 but also between the other network components illustrated in FIG. 1. In this case, the private network address ranges as set by RFC 1918 for Internet Protocol Version 4 or IPv4 and RFC 4193 for Internet Protocol Version 6 or IPv6 may be used. The various examples set out below will use IP addressing schemes and principles for illustrative purposes.

Application servers 141-143 provide services over the network 140 to other computing devices. Application servers 141-143 and associated services may for example comprise mail servers, file servers, Customer Relationship Management or CRM services, Enterprise Resource Planning or ERP services, document management services, etc. A data connection may be established with an application server by opening a communication socket with the server on a port or port range associated with the service. Application servers 141-143 may correspond to physical devices with a physical networking interface associated with a private network address. Alternatively, application servers 141-143 may also correspond to virtual server instances running on one or more physical servers. Virtual server instances may each have a virtual network interface with an associated private network address. Application servers 141-143 may also correspond to services running within dedicated user space instances by applying operating system virtualization. Such user space instances are sometimes referred to as containers, zones, virtual private servers, partitions, virtual environments, virtual kernels, or jails. Application servers 141-143 may then resolve to the same internet address but be addressed via different unique URLs.

Some of the application servers 141-143 may be accessible as a web service by issuing requests to the web service in the form of a uniform resource identifier that is supported by a web browser. Such a web service may for example operate according to the Hypertext Transfer Protocol (HTTP) to provide data services to a web browser.

The private network 140 is separated from external network 180 by one or more gateways 100 allowing networking traffic between the external network 180 and the private network 140 in a controlled way. The system of FIG. 1 allows identifying security clients 121, 122 as trusted clients, i.e., as having access rights to the application servers 141-143 within the private network 140 in order to use the services running on these application servers. A security client 121, 122 is thereby understood as logic that is configured to execute the steps according to the described example embodiments. Gateway 100 further allow granting the security clients 121, 122 network access to a selection of the application servers 141-143 to which the security clients 121-122 are allowed access to and denying network access to the application servers 141-143 which are not part of this selection. For this purpose, the gateway 100 further comprises a tunnel module 101. The tunnel module 101 establishes networking tunnels upon request of security clients 121, 122 within the external network 180.

In the example of FIG. 1, networking tunnels 181, 182 are established between the tunnel module 101 and the security clients 121, 122 respectively. By such tunnels 181, 182, a virtual private network or VPN is established extending the private network 140 up to the security clients 121, 122. This way the security clients 121,122, although within network 180, obtain a private network address in the range of the private network 140 and can potentially access all application servers 141-143 by their respective private network address. Networking tunnel 181, 182 is established upon request of the security client 121, 122, thereby providing tunnel authentication information to the tunnel module 101. This authentication information may for example comprise a username and password. The tunnel authentication module 105 verifies the tunnel authentication information. If the authentication is successful, the networking tunnel 181, 182 is established with the respective security client 121, 122. Several methods may be used by the tunnel authentication module 105 such as for example passwords, biometrics, two-factor authentication, or other cryptographic methods. The data travelling in the networking tunnels 181, 182 may further be protected by encryption, for example according to the Internet Protocol Security or IPsec protocol, Transport Layer Security or TLS and Datagram Transport Layer Security or DTLS.

The gateway 100 further comprises a firewall 102. The firewall 102 controls the traffic between the security clients 121, 122 and the application servers 141-143 after the respective tunnels 181, 182 have been established. This is done according to firewall rules provided by the firewall configuration module 103. The firewall configuration module 103 obtains these rules from client access lists received from the respective security clients 121, 122 which, on their turn, receive the client access list from access controller 160. The firewall rules allow a security client to establish and maintain network connections with the application servers 141-143. The selection of the which application servers 141-143 the security client 121, 122 can have network access to are determined by the client access list from which the firewall rules are obtained and are thus determined by the access controller 160. Preferably, the firewall 102 blocks all traffic from security clients 121, 122 over the secure tunnels 181, 182 by default. When a client access list indicates that for example security client 121 may access application server 141, the firewall configuration module 103 obtains the corresponding rule and activates it in the firewall 102. Then, the firewall 102 no longer blocks network traffic on the private network 140 between the security client 121 and the application server 141.

The access controller 160 includes an authentication module for authenticating security clients 121, 122 and generating client information. In other words, in order for a security client 121, 122 to get access to an application server 141-143 in the private network 140, it first needs to authenticate itself with access controller 160. The access controller 160 is not part of the private network 140, but is accessible by the security clients 121, 122 over the network 180. The authentication information provided by the security clients 121, 122 should be enough to uniquely identify the security client 121, 122 or the user of the security client. This may for example be done by providing a username and password which are verified by the authentication module 162. The authentication module 162 may further receive context or status information from the security client 121, 122. This information is delivered by the security client 121, 122 itself and cannot be verified by the access controller 160. It is therefore referred to as untrusted client context information. The client context information which is part of the client information may for example include: a hostname which may be in the form of a fully qualified domain name or FQDN such as for example "host.domain.com"; a family and a version number of the operating system running on the host; a patch level indicative for which patches have been applied to the operating system; a status of the anti-virus software installed on the client; how long the user has been logged on onto the client; any combination thereof, or the like.

The authentication module 162 may then further add trusted client information to the client information. According to embodiments, trusted client information may include user membership information indicative for user groups and departments the user belongs to. Such information may be provided by user directory systems such as RADIUS, LDAP or Active Directory (AD) services. Such information may also be obtained according to suitable protocols for exchanging authentication and authorization data such as for example according to the Security Assertion Markup Language, SAML, protocol, or according to the OAuth standard. The trusted client information can include history information on previous sessions of the client with the access controller 160, for example a last login timestamp and an amount of failed login attempts.

According to a preferred embodiment, the authentication module 162 includes a client list engine 163 and a tunnel list engine 165. Upon successful authentication by the authentication module 162, the tunnel list engine 165 generates a client tunnel list and the client list engine 163 generates a client access list based on the client information provided by the authentication module 162.

The client tunnel list comprises all information for an authenticated client 121, 122 to establish the respective tunnel 181, 182. According to embodiments, the client tunnel list includes network address information such as the destination IP address and/or destination port number of the gateway 100 in order for the security client 121, 122 to initiate the establishment of the respective tunnel 181, 182 by requesting the setup of a tunnel at the IP address and port number specified in the client tunnel list. The client tunnel list may further comprise the tunnel authentication information in order to authenticate the client 121, 122 with the authentication module 105 in the gateway 100. The tunnel authentication information generated by the tunnel list engine 165 may further be dynamic, i.e., not known by the authentication module 105 of the gateway 100 beforehand. In this case, the access controller 160 may forward the tunnel authentication information to the gateway 100 by a communication link 168 between the access controller 160 and the gateway 100.

The client access list identifies a selection of the application servers to which a security client is granted access to based on the client information. According to an embodiment, the client list engine 163 generates the firewall rules for the firewall 102 and includes these rules in the client access list. The firewall rules are then extracted from the client access list by the firewall configuration module 103 in the gateway 100 and applied to the firewall 102. The client access list may further add conditions to the addressing information of the application servers. An illustrative example of a client access list is show in the table below.

TABLE 1

Client access list with conditional application servers

| IP Address | Condition |
|---|---|
| 10.0.0.1 | TimeInterval(09.00-17.00) |
| 10.0.0.11 | Domain("domain.com") |
| 10.0.0.3 | StringPrefix(username, "adm_") |

The first column specifies the IP address of the application server to which the security client 121, 122 is granted network access to. The second column further specifies a condition that needs to be fulfilled in order to have the access. The first condition specifies a specific time interval during which the security client 121, 122 is granted access to the application server 10.0.0.1. the second condition specifies a specific domain from which the request should originate, i.e., it specifies the domain from which the security client 121, 122 may access the application. This may for example be used by a company to only allow access from its own domain, i.e., from within the company's network. The third example could be used to identify a specific user or group, in this case the company's administrators, which are the only one that could be able to access a given application server or networking device.

The client access list may further identify a domain name system, DNS, server 144 within the private network 140 for resolving the private network address of the application servers 141-143 by their domain name. This may be particularly useful when an application server operates as web service. In such case a human readable host name within a URI can be resolved to the private network address.

According to an embodiment, the access controller 160 further includes a signature module 164 for creating a signed list such as a signed client access list and signed client tunnel list. This signature is verified by the signature verification module 104 in the gateway 100 upon reception of the client access and tunnel list. The signature may be generated and verified by a signature key shared between the gateway 100 and the access controller 160. This way, the client access list and client tunnel list is not alterable by the security clients 121, 122 without the gateway 100 notifying it. If the gateway 100, upon verification of the signature, notifies that the client access list or client tunnel list was changed, the network connection with the security client 121, 122 is broken. This event may further be reported back to the access controller 160 which may further use it as trusted client information in future sessions with the security client 121, 122.

According to embodiments, the access controller 160 is further adapted to break established networking tunnels 181, 182 by sending a message to the gateway 100 over the communication link 168 instructing the tunnel module 101 to break a networking tunnel and to remove the firewall rules from the firewall 102 allowing the respective client access to the application servers 141-143.

Security clients 121, 122 as illustrated in FIG. 1 may be implemented and used according to different implementation scenarios for providing a user access to a private network 140.

Figure 2:
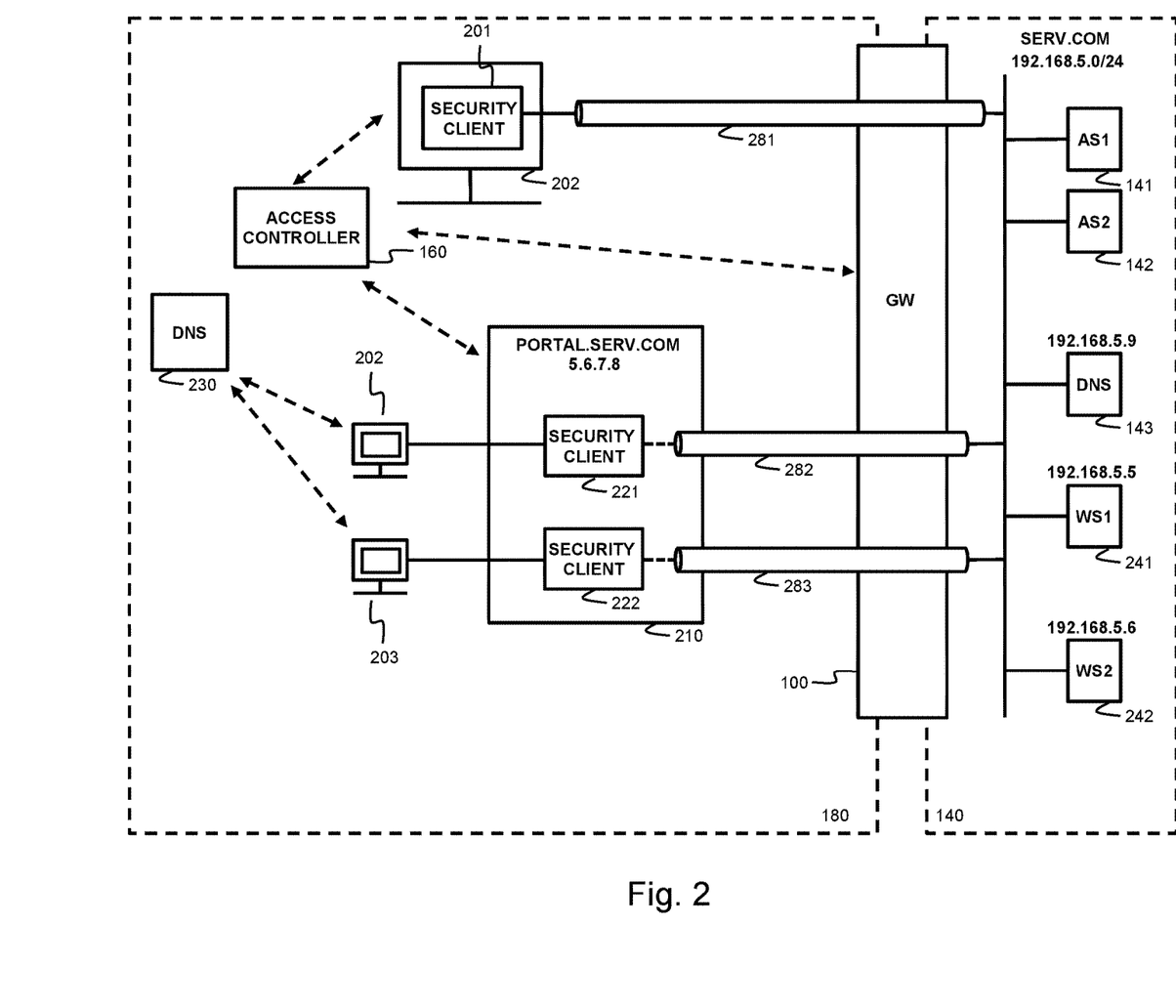
FIG. 2 illustrates a system for accessing a private network according to example embodiments.

FIG. 2 illustrates such implementation scenarios according to example embodiments. In a first example scenario, a security client 201 runs as a software agent on an end user device 202. Such end user device 202 may for example correspond to a desktop computer, a laptop computer, a mobile communication device, a tablet and the like. When the user authenticates with access controller 160, the security client 201 establishes the networking tunnel 281 and connects to the private network 140 thereby obtaining access to any server as granted by the client access list. When established, applications running on the end user device 202 may access services provided by the servers within the private network 140. For example, the end user device 202 may access a mail server within the private network by its email program, access a file server within the private network by a file explorer using a remote file access protocol, or may access a webservice 241, 242 using a browser application. When connected to the private network 140, the end user device 202 may resolve host and domain names from the private DNS server 143. For example, WS1.SERV.COM will resolve to 192.168.5.5 and WS2.SERV.COM will resolve to 192.168.5.6.

According to another implementation scenario, webservices such as identified by WS1.SERV.COM 241 and WS2.SERV.COM 242 may further be made accessible outside the private network 140 by means of a reverse proxy web portal server 210, further referred as portal 210 or portal server 210. For example, portal 210 may be publicly accessible by public address 5.6.7.8. The public address may further be resolved by a public DNS server 230 from its domain name, e.g. PORTAL.SERV.COM or SERV.com. As such, when an end user client is not connected to the private network 140 by a networking tunnel with gateway 100, the domain will resolve to the public network address of the portal 210. On the other hand, when an end user device 202 is connected to the private network 140 by means of a security client 201, the domain SERV.com will resolve to the private network 140.

Portal 210 is further configured as a reverse proxy for one or more of the webservices 241, 242 within the private network 140. An end user device 202, 203 may then connect with the portal 210 by using a web browser application such as Chrome, Firefox, Edge and Safari. This way, when specifying a URL within the domain SERV.COM, the browser application will be directed to portal 210. When an end user device 202 connects to portal 210 a security client running within the portal 210 is assigned to the web browser session. A web page is then served to the end user device 202 which allows authentication with access controller 160. Upon successful authentication, the security client 221 establishes a networking tunnel 282 with gateway 100. The access controller then allows the security client 221 to access one or more of the webservices 241, 242 within the private network 140. As the portal 210 operates as a reverse proxy, the webservices 241, 242 are then proxied to the browser application of the end user devices 202, 203 from the portal's public address.

Figure 3:
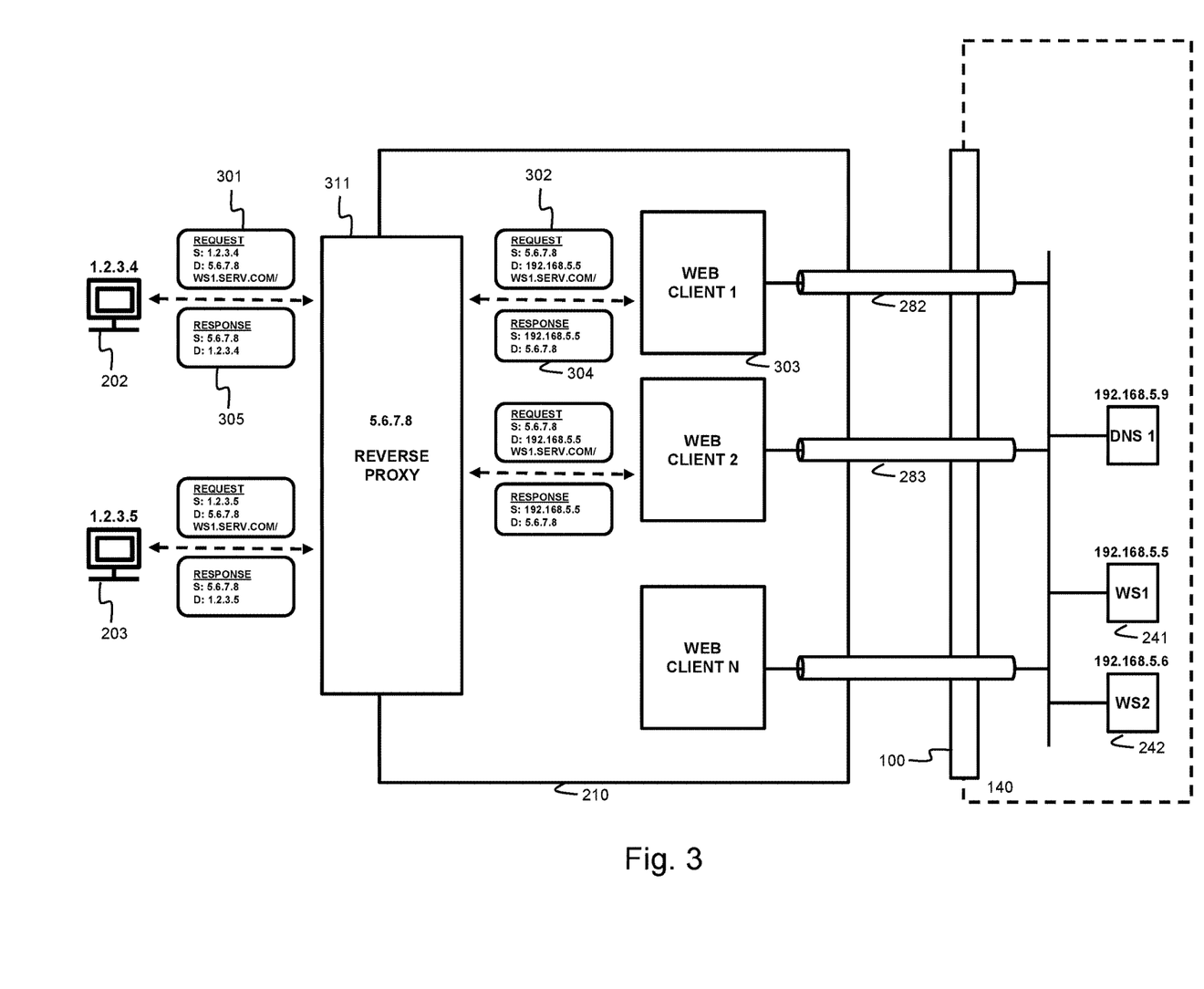
FIG. 3 illustrates a web portal for accessing web services within a private network.

FIG. 3 illustrates the reverse proxy operation of the portal 210 according to an example embodiment. In this example, end user devices 202 and 203 are already authenticated by respective security clients 221, 222 through interaction with access controller 160. The browser application of end user device 202 then performs requests 301 for services within the private network 140, e.g. for webservices 241 and 242. For example, end user device 202 sends a request 301 for webservice WS1.SERV.COM to the portal's address 5.6.7.8 with its own network address 1.2.3.4 as source address. The portal 210 on its turn contains a reverse proxy module 311 which alters the request 301 to a request 302. In this request 302 the source address is changed to the local address of the portal 210 and the destination address is changed to the private network address of the requested service, e.g. 192.168.5.5 for webservice WS1.SERV.COM. In the example of FIG. 3, the public address of the portal 5.6.7.8 corresponds to its local address, i.e. 5.6.4.8. According to example embodiments, portal 210 may be publicly accessible by a public network address but have a different local network address. Within portal 210, the request 302 is forwarded to a web client 303. Web client 303 provides the same functions as the security client but interacts with the end user device 202 by means of a web interface. The web clients 303 further operate in their own network name space, i.e. from a network perspective the web clients are part of a different subnet with a different routing table.

As the request is directed to webservice 241, the web client 303 then forwards the request along networking tunnel 282 to the private network 140 and thereby to web service 241. Reversely, a response 304 of web service 241 will be redirected by the gateway 100 over networking tunnel 282 to web client 303 which on its turn will forward the response to the reverse proxy module 311. Module 311 then alters the response 304 by adding the portal's public address as source address and the clients address as destination address. The so-obtained response 305 is then forwarded along the public network to end user device 202.

Figure 4:
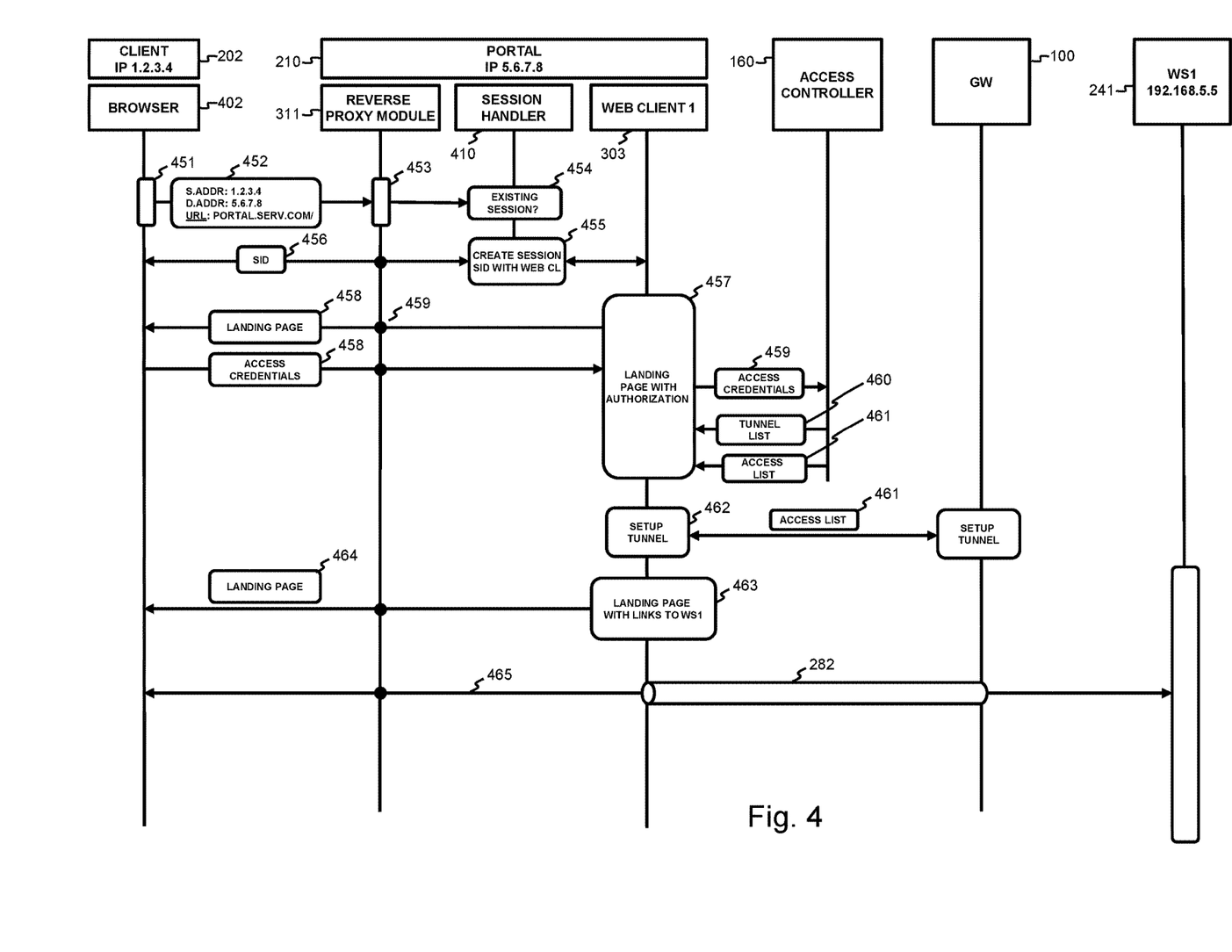
FIG. 4 shows steps performed for establishing a web session with a web service within a private network by means of a reverse proxy web portal according to example embodiments.

FIG. 4 illustrates how a connection between end user device 202 and web service 241 is established according to an example embodiment. The end user device 202 runs a browser application 402. According to a step 451, the browser application initiates a connection with portal 210. This step may for example be initiated by a user that provides the URL PORTAL.SERV.COM to the browser application that, on its turn, resolves the URL to the network address of the portal, i.e. 5.6.7.8. The browser application 402 then sends a request 452 to the portal 210 for the webpage according to the supplied URL. The request 452 is then routed along the public network to the portal 210, more particular to the reverse proxy module 311 within the portal 210.

According to step 453, the reverse proxy module 311 then interacts with a session handler 410 to verify according to step 454 whether the request 452 is part of an existing web session. If not, the session handler proceeds to step 455, assigns the new web session to web client 303 and identifies the web session by a session identifier 456, session id 456 or sid 456 (for brevity). The session identifier 456 is also provided to the browser 402 and stored, e.g. in the form of a cookie. The browser 402 then uses the session identifier 456 in all further communication with the portal 210 to identify the current web session. In order to reduce the time for establishing a new web session, the session handler may keep a certain number of unassigned web clients running in the background. As the web client 303 has its own network name space, the session handler configures a routing table for routing of packets within the web client's network name space. Traffic belonging to the web session 456 will then be handled by this routing table.

When the web client 303 is assigned to the web session, it responds to the initial request 452 by serving a landing page 458 according to step 457 to the browser 402. Communication between the web client 303 and browser 402 is thereby performed through the proxy module 311 as described with reference to FIG. 3. This interaction with the proxy module is further illustrated by a dot 459 on the sequence line of the proxy module 311.

As the user is not yet authorized with access controller 160, the landing page 458 requests the user for the necessary access credentials, e.g. a username and password. These access credentials are then provided to web client 303. The web client 303 then authenticates the user with the access controller 160 in the same way as described with reference to FIG. 1 and thereby obtains the tunnel list 460 and client access list 461 from the access controller. Other forms of authentication may be used in a similar fashion, e.g. using a one-time-password, OTP, multi-factor authentication, SAML, and Oauth. Web client 303 may provide further information to access controller 160 together with the access credentials, e.g. location data of the user, the type of browser that is used to access the portal 210 and security features of the web session. Such further information may then be used by the access controller 160 to further grant or restrict access to the webservices.

Then, according to step 462, the web client 303 establishes the networking tunnel 282 with gateway 100 and provides the access list 461 to the gateway 100. The gateway then applies the firewall rules as specified in the access list 461 and thereby grants the web client 303 access to webservice 241. When the networking tunnel 282 is established, the web client 303 proceeds to step 463 and serves an updated landing page 464 to the browser application 402. This updated landing page 464 may then communicate the successful authentication. The landing page 464 may also provide links to the webservices that the user is granted access to, e.g. by providing a link to WS1.SERV.COM. Following the described initialization sequence, the browser has now a browser-based connection 465 and thus a web session with the webservice 241. From the browser point of view, there is a public connection with the webservice 241 as it is addressed by the public network address of the portal 210. From the webservice's 241 point of view, it is still accessed from within the private network 140. The connection 465 still provides the same security as with a stand-alone security client 121, 122 because the web client provides the same security features. The advantage is that the end user device 202 does not need to have a dedicated security client installed, but only requires a standard browser application to access the web services within the private network 140.

Figure 5:
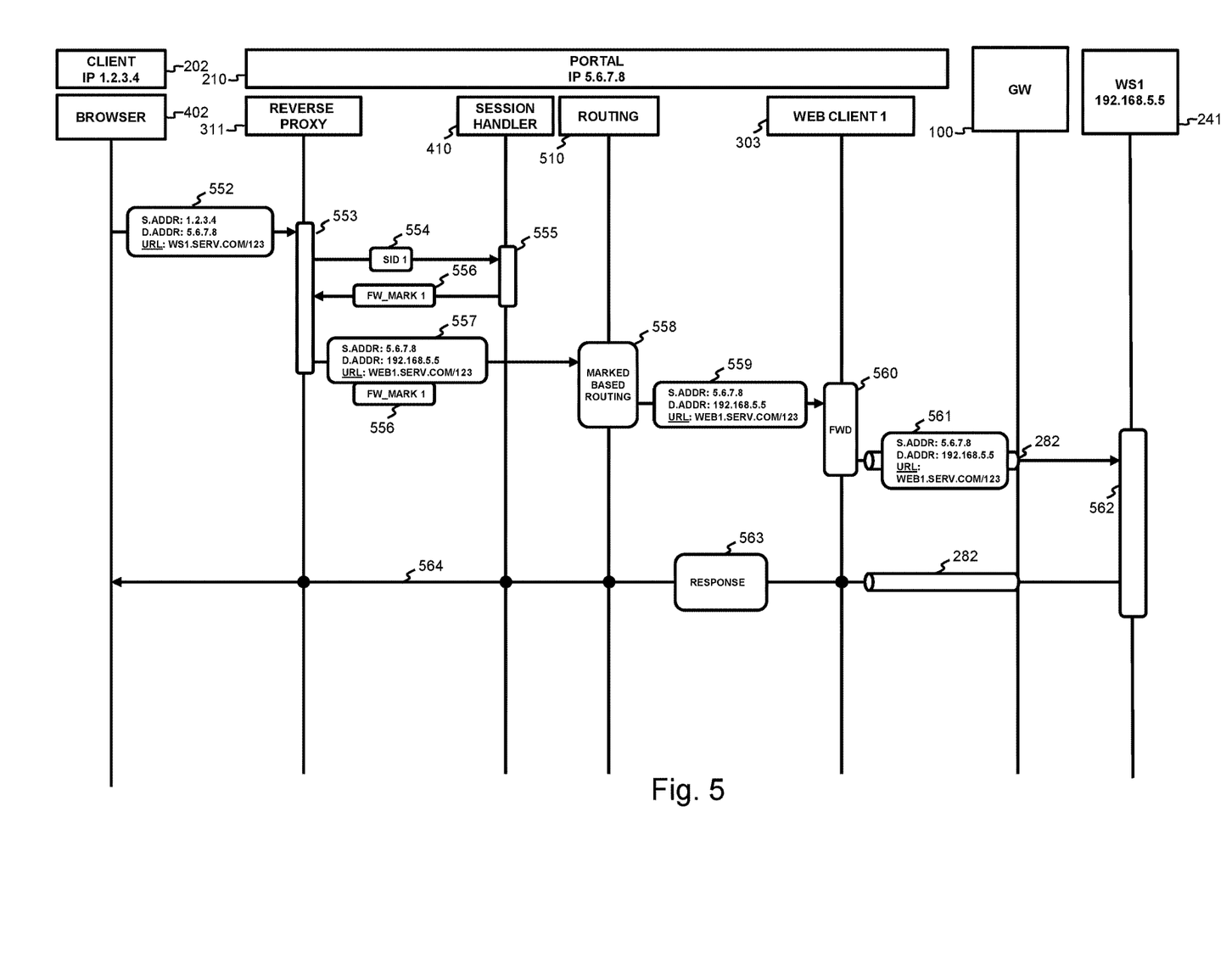
FIG. 5 shows steps performed for routing a request from a browser application within a reverse proxy web portal to a web service in a private network according to example embodiments.

FIG. 5 illustrates how a request 552 from the browser 402 is routed over the established connection 465 to the webservice 241 according to an example embodiment. As an example, the browser requests a certain URL WS1.SERV.COM/123 from the portal 210. This request 552 is then routed over the public network 180 to the portal 210 and received by the reverse proxy module 311.

According to step 553, the reverse proxy module 311 then retrieves the web session id 554 and forwards it to the session handler 410. According to step 555, the session handler then looks up a forward mark 556 that is associated with the web session. This forward mark 556 may be associated with the web session upon its creation under step 455 of FIG. 4. The forward mark 556 may for example be a number of any byte size, e.g. an 8-bit, 16-bit, 24-bit or 32-bit number. Upon receipt of the forward mark 556, the reverse proxy module 311 performs the network address alteration and thereby obtains the altered request 557. Reverse proxy module 311 also attaches the forward mark 556 to the request 557, e.g. by incorporating the forward mark 556 in a header field of the request. The altered request is then forwarded to the new destination address as listed in the destination address field.

By this forwarding operation, the request 557 will arrive at the local routing module within the portal 210. If there would only be one single web client 303 running within the portal 210, the routing module could route the request 557 to the network name space to which the web client 303 belongs based on the destination address alone. However, during normal operation the portal 210 has several sessions running and thus several web clients. Each of these web clients might have a route to the private network. Because each web client and thus networking tunnel is setup according to user specific rules, it is important that all requests from end user device 202 are handled specifically by web client 303. To this purpose, the routing module 510 is configured to perform mark-based routing 558. Upon receipt of the request 557, the routing module 510 not only considers the destination address of the request 557 but also considers the forward mark 556 attached to the request. Based on this forward mark 556, as configured by the session handler 410, the routing module 510 then establishes that the request must be forwarded to the subnet which is allocated to web client 303 and which will handle the request further.

According to step 560, the web client 330 then receives the request 559. As the request is targeted towards the private network, the web client 330 then forwards it as request 561 along the already established networking tunnel 282. Upon arrival at the gateway 100, the request 561 is forwarded to the web service 241 within the private network. According to the request, the web service 241 then constructs a response 563 under step 562 and provides it along the same networking path to the end user device 202 for display in the browser application 402.

According to example embodiments, the web client 303 performs source network address translation, SNAT, when forwarding the request 561 over the networking tunnel 282, i.e. the source address is replaced with the network address of the networking tunnel 282. Further, also the gateway 100 can perform such a SNAT when the request 561 is forwarded to the private network by replacing the source network address with the network address of the networking tunnel at the gateway side.

Figure 6:
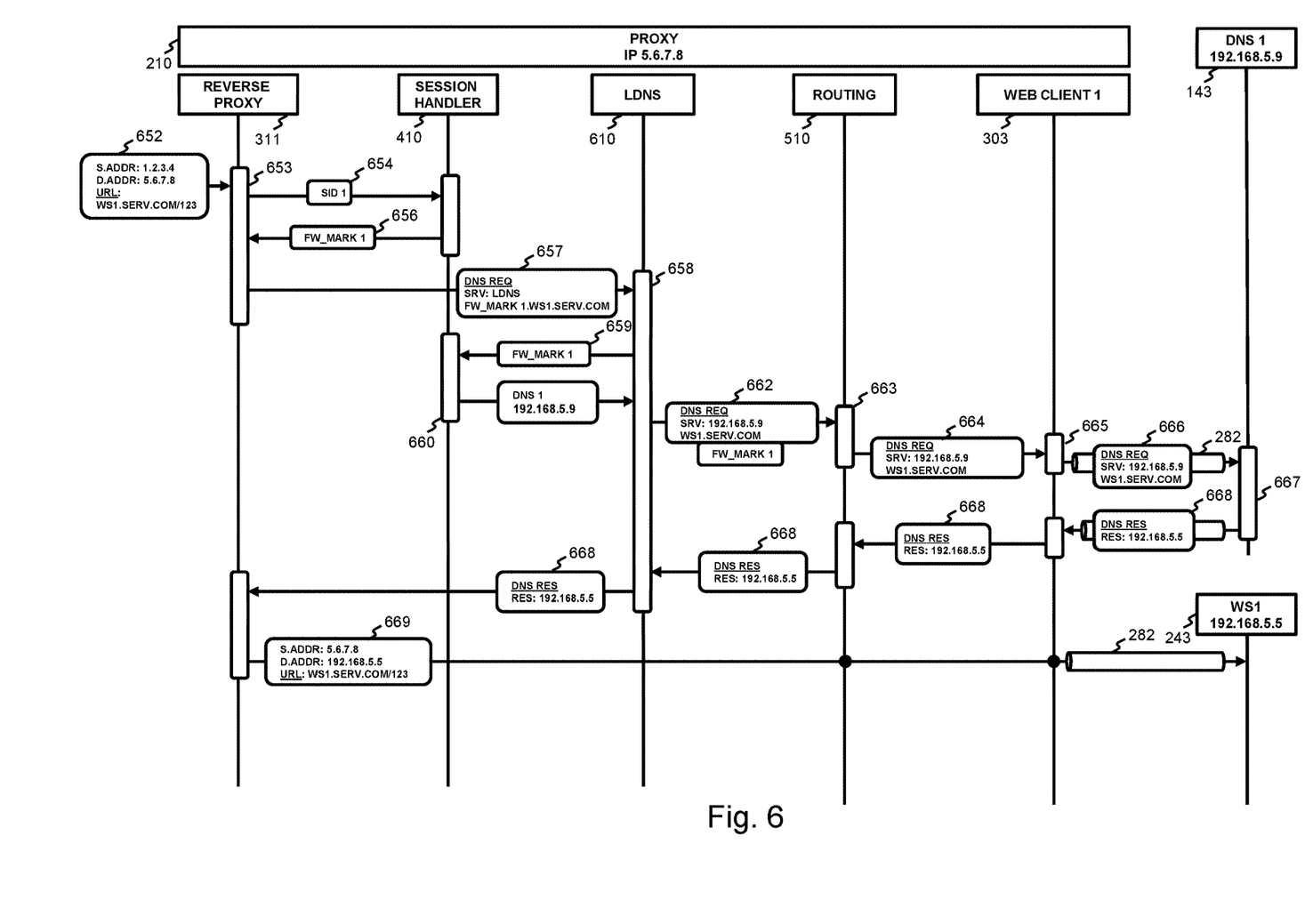
FIG. 6 shows steps performed by a reverse proxy web portal for resolving a private network address from a domain name.

FIG. 6 illustrates how a request 652 from the browser is routed over an established connection 465 to the webservice 241 according to an example embodiment. In the example of FIG. 6, the portal 210 needs to resolve the destination address of the request 652 according to a domain name system, DNS, service. As an example, the request 652 as received by the portal 210 contains a URL for WS1.SERV.COM/123. According to step 653, the reverse proxy module 311 receives the request 652 and, thereupon, retrieves the forward marker 656 from the session handler 410 by means of the web session identifier 656. Then, the reverse proxy module 311 needs to replace the destination address in the request 652. In order to do so, the reverse proxy module needs to resolve the network address for the domain name WS1.SERV.COM as identified in the URL of the request 652. This information is maintained in the DNS server 143 that provides the domain name services for the private network 140, i.e. for private network 192.168.5.0/24. However, there may be different DNS servers within the private network 140 and they may be assigned differently to different users and thus to different networking tunnels. Further, more than one DNS server may be assigned to a user for redundancy. It is therefore important that DNS requests are issued to the correct DNS server or servers and along the networking tunnel that is associated with the web session id 654 of the request 652. To this purpose, still according to step 653, the reverse proxy module 311 first constructs a DNS request for a domain name that contains the actual forward mark 656 as obtained from the session handler 410. For example, reverse proxy module may prepend the forward mark 656 to the domain name that is to be resolved, i.e. domain name WS1.SERV.COM is altered to FW_MARK 1.WS1.SERV.COM.

This DNS request 657 is then forwarded to a local DNS service 610 within the portal 210. In other words, DNS service 610 serves as primary DNS server for DNS requests of reverse proxy module 311. According to step 658, upon receival of the DNS request 657, local DNS service 610 extracts the forward mark 656 from the modified domain name. Then, local DNS service 610 issues a request 659 to session handler 410 for one or more of DNS server assigned to the forward mark 656 and thus also assigned to the web session. According to step 660, session handler 410 then replies with the private network address of the DNS server 143. The local DNS service 610 then performs a DNS request 662 for the original domain name to the identified DNS server 143 within the private network 140. Further, local DNS service 610 also marks the request 662 with the forward marker 656 associated with the web session.

According to step 663, the request 662 will arrive at the local routing module 510 of the portal 210. The routing module 510 then performs the described mark-based routing 663 and forwards the request 664 to the web client 303 that is associated with the web session. According to step 665, the web client 330 then receives the request 664 and forwards it as request 666 along the already established networking tunnel 282 to the DNS server 143 within the private network 140. According to the request, the DNS server 143 then resolves, under step 667, the domain name WS1.SERV.COM to the private network address 192.168.5.5 and sends it back as DNS response 668 to web client 303. The web client then forwards the response to the reverse proxy module 311. As the domain name is now resolved, the reverse proxy module 311 alters request 652 and forwards it as request 668 to the web service 243 along networking tunnel 282.

Figure 7:
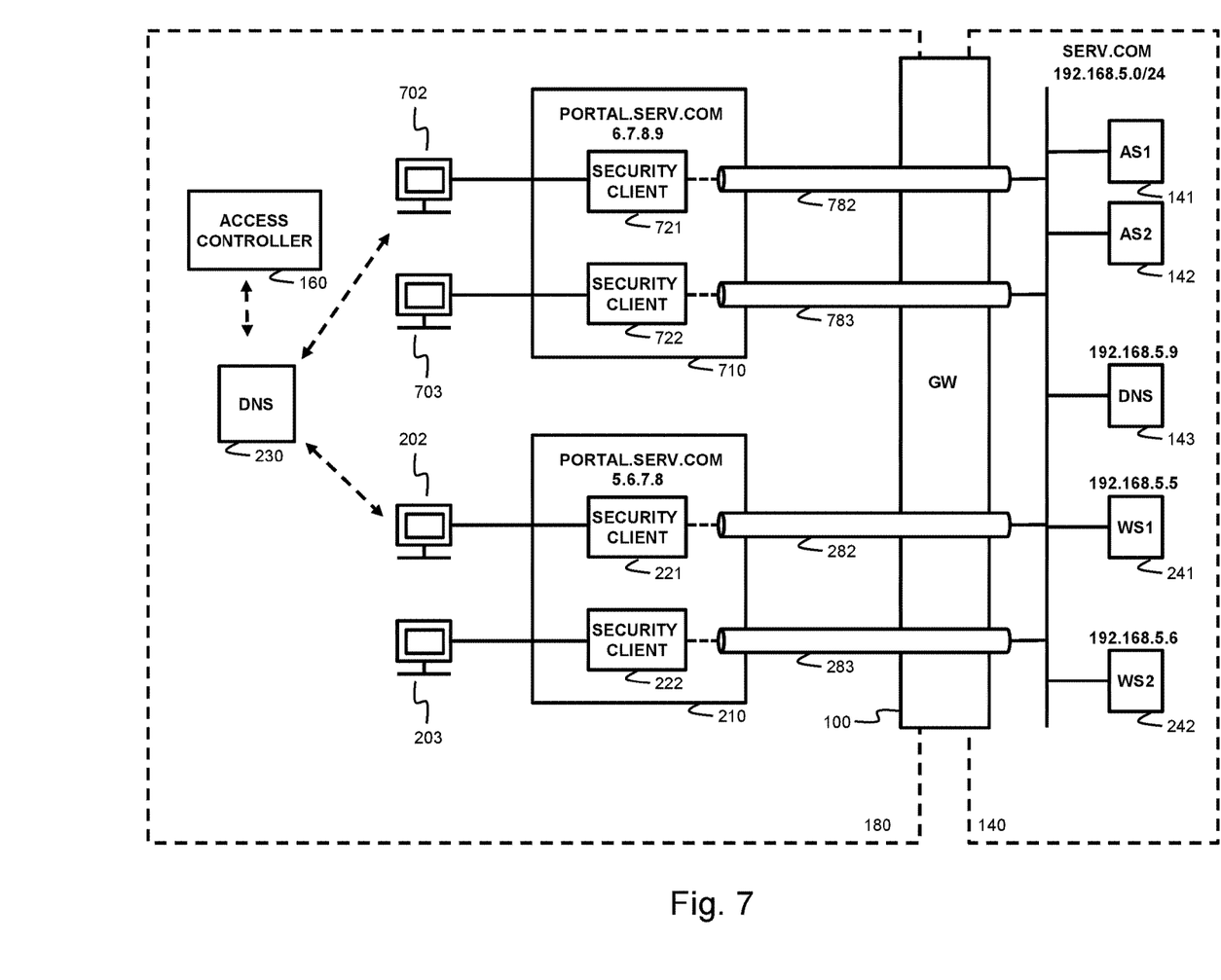
FIG. 7 illustrates a system for accessing a private network having two portals according to an example embodiment.

FIG. 7 illustrates a system wherein there two portals 210 and 710 provide browser-based access to web services 241, 242 within the private network 140. Clients 702 and 703 then connect to the second portal 710 that runs the respective security clients 721, 722 each having a networking tunnel 782, 783 to the private network 140. In this case, the portals have different network addresses such that the security clients 702 and 703 are directed to second portal 710 when resolving the domain SERV.COM of the private network. This may be achieved by incorporating location-based domain name serving within the public DNS server 230. In such case the DNS server 230 will give a different response to DNS request depending on the location of the client. This has the advantage that portals can be provided in different regions such that they are located closer to the clients. This way a DNS based load balancing of the portals 710, 210 is achieved.

According to example embodiments, portals 210 and 710 may be provided with different local network addresses but with the same public network address by means of load balancing. Such load balancing may be provided by a load balancing proxy server that dispatches incoming connections to one of the portals 210, 710. When dispatching, the load balancing server performs a destination network address translation, DNAT, on the network packets.

Figure 8:
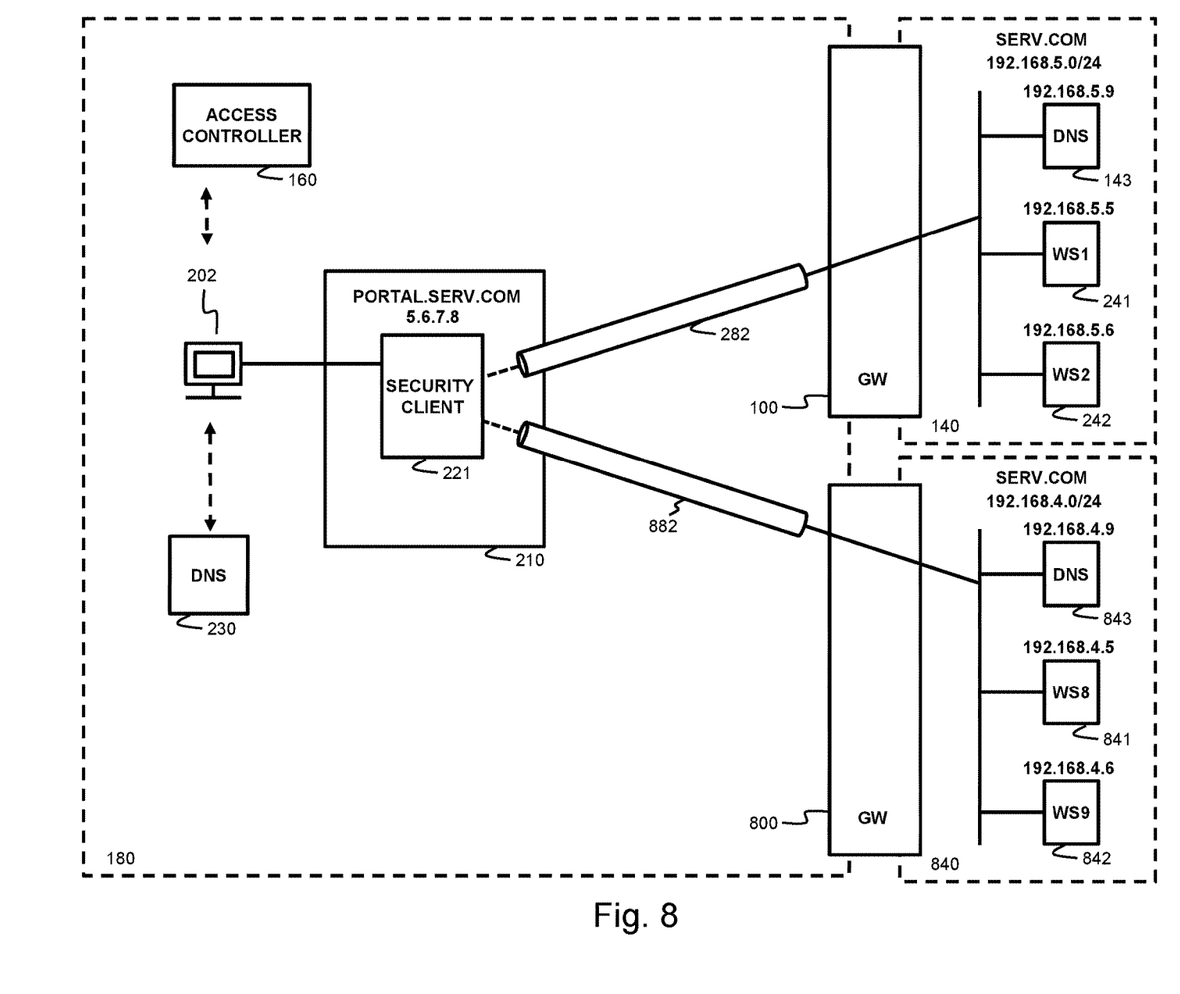
FIG. 8 illustrates a system for accessing two private networks by one portal.

FIG. 8 illustrates a system wherein the portal 210 provides access to two different private networks 140 and 840 according to an example embodiment. The second private network 840 covers a different range of network addresses, e.g. 192.168.4.0/24, and further comprises a DNS server 843 and two web services 841 and 842. The access controller 160 may then provide authorization to end user device 202 to access the web services within both private networks, e.g. by providing tunnel information to establish both tunnels 282 and 882 and to specify the webservices from both private networks in the client access list. When establishing the connection, the web client then establishes both networking tunnels 282 and 882, e.g. according to the steps as shown in FIG. 4.

As used in this application, the term "circuitry" may refer to one or more or all of the following: (a) hardware-only circuit implementations such as implementations in only analog and/or digital circuitry and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present disclosure has been illustrated by reference to specific embodiments, it will be apparent to those skilled in the art that the disclosure is not limited to the details of the foregoing illustrative embodiments, and that the present disclosure may be embodied with various changes and modifications without departing from the scope thereof. The present embodiments are therefore to be considered in all respects as illustrative and not restrictive, the scope of the disclosure being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the disclosure are capable of operating according to the present disclosure in other sequences, or in orientations different from the one(s) described or illustrated above.

What is claimed is:

1. A method, comprising:
   establishing a browser session in response to receiving a request from a browser application in a public network;
   assigning the browser session to a dedicated network service running in a dedicated network name space;
   proxying, by a proxy, requests received from the browser application to the dedicated network service;
   authenticating, by a local web session in the dedicated network service, a user of the browser application for access to at least one private webservice, wherein the authenticating comprises authenticating the user with an authentication server, and receiving from the authentication server a client access list identifying at least one private name resolving service for resolving a private network address of the private webservice, and wherein the client access list further identifies the private webservice and at least one remote gateway for accessing the private webservice;

establishing, by a security client in the dedicated network service, a networking tunnel between the proxy and a remote gateway to a private network, thereby obtaining network access to the private webservice from the dedicated network name space; and forwarding, within the dedicated network name space, proxied requests addressing the private webservice over the networking tunnel to the private network.

2. The method of claim 1, wherein the proxying comprises:
marking the requests of the browser application to identify the browser session; and
identifying the dedicated network service and routing the requests to the dedicated network service.

3. The method of claim 1, wherein the proxying further comprises:
replacing a source address of the requests of the browser application with a network address of the proxy.

4. The method of claim 3, wherein the proxying further comprises:
when a request is destined for a domain name, resolving the private network address of the private webservice by performing a name resolving request over the networking tunnel within the private network; and
replacing a destination address of the request with the private network address.

5. The method of claim 4, wherein the resolving further comprises:
marking the name resolving request according to the browser session;
forwarding the marked name resolving request to a local name resolving service within the proxy;
based on the marking, identifying a private name resolving service within the private network assigned to the security client;
unmarking and forwarding the name resolving request to the identified private name resolving service; and
receiving the resolved private network address in return.

6. The method of claim 1, wherein the establishing the networking tunnel further comprises:
obtaining at least one private name resolving service for resolving domain names within the private network.

7. The method of claim 5, wherein the establishing the networking tunnel further comprises:
registering the private name resolving service with the local name resolving service; and associating the private name resolving service with the browser session.

8. The method of claim 1, wherein the proxying further comprises:
when receiving a request associated with an unauthenticated web session, redirecting the request to a landing page to perform the authenticating the user.

9. The method of claim 1, wherein the proxying further comprises:
when receiving a request for the proxy, and when the request is associated with an authenticated web session, then redirecting the request to a landing page with a reference to the private webservice.

10. The method of claim 1, wherein the authenticating further comprises:

receiving access credentials from the user, wherein the authenticating is performed using the access credentials; and
receiving from the authentication server a client tunnel list comprising tunnel authentication information for establishing network tunnels with the remote gateway.

11. A controller, comprising at least one processor and at least one memory including computer program code, the at least one memory and computer program code configured to, with the at least one processor, cause the controller to perform:
providing browser-based access from a public network to at least one private webservice, wherein the private webservice is network addressable by a private network address within a private network, and wherein the private webservice is identifiable by a domain name that resolves to the private network address within the private network and resolves to the controller within the public network;
upon request of a browser application in the public network, establish a browser session;
assign the browser session to a dedicated network service running in a dedicated network name space;
proxying requests received from the browser application to the dedicated network service and vice versa;
authenticate, by a local web session in the dedicated network service, a user of the browser application for access to the at least one private webservice, wherein the authenticating comprises authenticating the user with an authentication server, and receiving from the authentication server a client access list identifying at least one private name resolving service for resolving the private network address, and wherein the client access list further identifies the private webservice and at least one remote gateway for accessing the private webservice;
establish, by a security client in the dedicated network service, a networking tunnel between the controller and a remote gateway to the private network thereby obtaining network access to the private webservice from the dedicated network name space; and
forwarding, within the dedicated network name space, proxied requests addressing the private webservice over the networking tunnel to the private network.

12. A computer readable storage medium comprising computer-executable instructions for performing a method when the instructions are run on a computer, the method comprising:
establishing a browser session in response to receiving a request from a browser application in a public network;
assigning the browser session to a dedicated network service running in a dedicated network name space;
proxying, by a proxy, requests received from the browser application to the dedicated network service;
authenticating, by a local web session in the dedicated network service, a user of the browser application for access to at least one private webservice, wherein the authenticating comprises authenticating the user with an authentication server, and receiving from the authentication server a client access list identifying at least one private name resolving service for resolving a private network address of the private webservice, and wherein the client access list further identifies the at least one private webservice and at least one remote gateway for accessing the private webservice;
establishing, by a security client in the dedicated network service, a networking tunnel between the proxy and a remote gateway to a private network, thereby obtaining network access to the private webservice from the dedicated network name space; and forwarding, within the dedicated network name space, proxied requests addressing the private webservice over the networking tunnel to the private network.

13. The computer readable storage medium of claim 12, wherein the proxying comprises:

marking the requests of the browser application to identify the browser session; and identifying the dedicated network service and routing the requests to the dedicated network service.

14. The computer readable storage medium of claim 12, wherein the proxying further comprises:

replacing a source address of the requests of the browser application with a network address of the proxy.

15. The computer readable storage medium of claim 14, wherein the proxying further comprises:

when a request is destined for a domain name, resolving the private network address of the private webservice by performing a name resolving request over the networking tunnel within the private network; and replacing a destination address of the request with the private network address.

16. The computer readable storage medium of claim 15, wherein the resolving further comprises:

marking the name resolving request according to the browser session;

forwarding the marked name resolving request to a local name resolving service within the proxy;

based on the marking, identifying a private name resolving service within the private network assigned to the security client;

unmarking and forwarding the name resolving request to the identified private name resolving service; and receiving the resolved private network address in return.

17. The computer readable storage medium of claim 12, wherein the establishing the networking tunnel further comprises:

obtaining at least one private name resolving service for resolving domain names within the private network.

18. The computer readable storage medium of claim 17, wherein the establishing the networking tunnel further comprises:

registering the at least one private name resolving service with a local name resolving service; and associating the at least one private name resolving service with the browser session.

19. The computer readable storage medium of claim 12, wherein the proxying further comprises:

when receiving a request associated with an unauthenticated web session, redirecting the request to a landing page to perform the authenticating the user.

20. The computer readable storage medium of claim 12, wherein the proxying further comprises:

when receiving a request for the proxy, and when the request is associated with an authenticated web session, then redirecting the request to a landing page with a reference to the private webservice.

* * * * *